United States Patent [19]

Lapeyre

[11] Patent Number: 4,705,372
[45] Date of Patent: Nov. 10, 1987

[54] CAMERA FOR RECORDING KEYBOARD ENTRY OF DATA ON FILM EDGE

[75] Inventor: James M. Lapeyre, New Orleans, La.

[73] Assignee: The Laitram Corporation, New Orleans, La.

[21] Appl. No.: 917,520

[22] Filed: Oct. 10, 1986

[51] Int. Cl.⁴ ............................................. G03B 17/24
[52] U.S. Cl. .................................................... 354/106
[58] Field of Search ........................ 354/105, 106, 109

[56] References Cited

U.S. PATENT DOCUMENTS

| | | | |
|---|---|---|---|
| 3,953,868 | 4/1976 | Kawamura et al. | 354/105 |
| 4,330,186 | 5/1982 | Hattori | 354/106 |
| 4,344,682 | 8/1982 | Hattori | 354/106 X |
| 4,361,388 | 11/1982 | Mlcak et al. | 354/106 |
| 4,384,771 | 5/1983 | Sakurada et al. | 354/105 |
| 4,497,552 | 2/1985 | Howard et al. | 354/106 |

Primary Examiner—Michael L. Gellner
Attorney, Agent, or Firm—Laurence R. Brown

[57] ABSTRACT

This invention provides in a compact roll film type camera a data processing system for recording at least one line of information along the edge of a picture, to present variable and manually entered data relating to the picture. It contains entirely within the camera cover the keyboard and film recording equipment. The line of information is recorded by programming stored data for synchronous presentation along the edge of a frame when it is being moved to frame another picture. Only seven keyboard keys are needed to give a full range of alphanumeric data entry with each entry requiring two successive keystrokes.

12 Claims, 6 Drawing Figures

FIG. 2.
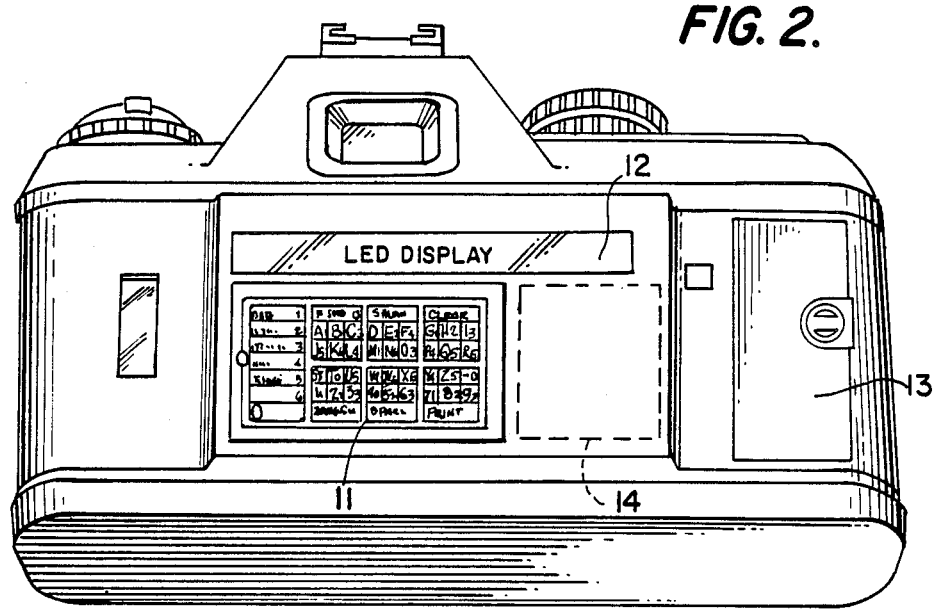
FIG. 3.
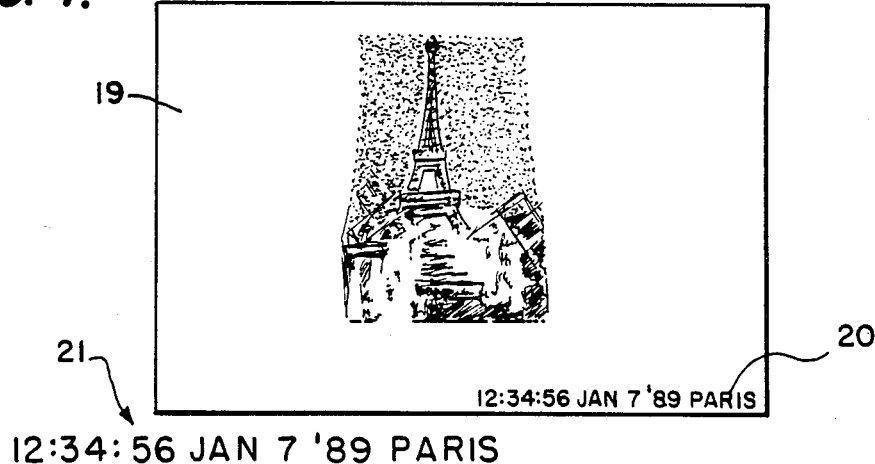
FIG. 4.
12:34:56 JAN 7 '89 PARIS

CAMERA FOR RECORDING KEYBOARD ENTRY OF DATA ON FILM EDGE

TECHNICAL FIELD

This invention relates to compact roll film cameras and more particularly it relates to the entry of variable data on the edge of a film frame in response to a keyboard located on the camera.

BACKGROUND ART

There have been many problems in the compact camera art in providing a system making possible the recording of variable data records on photographic frames relating to date, place, frame number or sequence, identification and other necessary or desired coded data. Not only is very limited space in the compact cameras a general problem, but the regions of access to the film locations thereinside for location of optical systems conveying data to be recorded is limited to even a greater extent.

When the typewriter keyboard is considered as a standard for the manual entry of alphanumeric data, it appears that even the provisions of keyboard entry need be limited to decimal digits as in U.S. Pat. No. 4,361,388, Nov. 30, 1982 to L. Micak, et al. for example. Even then the amount of recorded information is limited to the number of character forming positions that can be arranged internally adjacent the film plane about the edges of the frame which is positioned for photographing through the camera optical and shutter system. Keyboard arrays because of the limited internal camera space have been contained in large size remote electronic processor devices attachable to the camera by an electronic cable, as in U.S. Pat. Nos. 4,384,771, May 24, 1983 to N. Sakurada, et al. and 3,953,868, Apr. 27, 1976 to T. Kawamura, et al.

The recording of data auxiliary to the photo taking process is normally done at the edges or the corners of the film frame where light emitting character formers are located. Keyboard entered information may be stored for later retrieval at a specified frame as set forth in U.S. Pat. No. 4,344,682 to S. Hattori, for example. In these prior art examples the auxiliary keyboard entered data is stored on the film photographically as the film is stationary in the framing position, either before or after the taking of a picture. In U.S. Pat. No. 4,497,552, Feb. 5, 1985 to L. C. Howard, et al. a calculator type display operable from a thirty key keyboard is moved physically to various film positions for recording a sequence of data entries. However, movement of such equipment in compact cameras is not feasible. Even fixed position character display lines formulated in electronic data processing equipment in response to typewriter like keyboards provides only a few characters of auxiliary data for any particular photo, as clear from U.S. Pat. No. 4,330,186, May 18, 1982 to S. Hattori.

The art has thus not been able to provide in a compact roll film type camera a versatile keyboard entry variable data alphanumeric suplmental photorecording system for entering a substantial number of coded characters to identify such information as the time, subject and place a particular picture was taken.

DISCLOSURE OF THE INVENTOR

The present invention thus provides in compact roll film cameras unlimited access to one or both edges of a photo frame along its entire edge for the storage of variable composed alphanumeric data in response to keyboard entries from only seven keys. The entire equipment involved is readily stored in the openable camera back which has a field of seven keys of large enough size to permit enough room for locating fingers thereon without interference.

Typical data that can be printed on the film edge includes date, hour, minute, place, identification and other variable data printed out in alphanumeric or other desired coded format. This is achieved by means of programming one line of photo elements such as light emitting diodes arranged in a plurality of dots to form the desired printed photo during the time that the film frames are advanced after a picture is taken. Thus, the keyboard entered data can be entered prior to advancement of the film frame. The amount of information to be recorded on each frame is limited only by the edge length of the photo which varies with film size.

BRIEF DESCRIPTION OF THE DRAWINGS

In the accompanying drawing like reference characters identify similar features to facilitate comparison between the views, in which:

FIG. 2 is a back perspective view of the camera showing the keyboard array for entering alphanumeric data for recording on the edge of the film, FIG. 3 is an enlarged view of the seven key keyboard array provided by this invention with its self contained coding index for data entry, FIG. 4 is a depiction of a photograph having alphanumeric data photographically recorded on the edge thereof as provided by this invention.

THE PREFERRED EMBODIMENT

Figure 1:
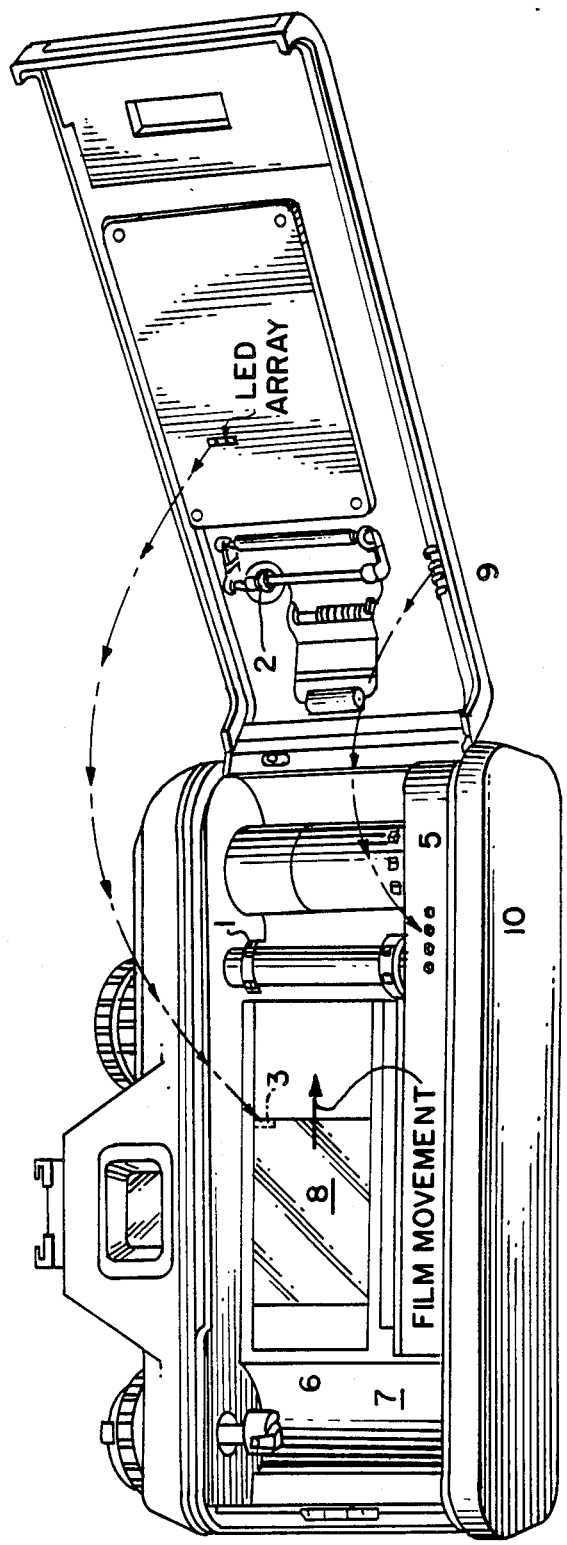
FIG. 1 is a perspective sketch of a compact roll film camera with its cover opened to show self contained electronic equipment for recording photographically a line of variable alphanumeric data on the film edge to identify particular photos in the manner provided by this invention.

As may be seen from the compact roll film camera in FIG. 1, the film moves in the direction of the arrow under the influence of the sprocket roll 1, either manually or motor driven. Synchronous operation of the electronic apparatus afforded by this invention is achieved by means of a mating sprocket wheel 2 which engages when the cover is closed, or an equivalent roller wheel engaging the film to turn when the film is advanced. In either case the length of the film is simply and precisely metered along the length thereof to partition the edge of the film along the sprocket edge(s) thereof for location of edge printed text within the borders of the photo frame 8, thereby to identify each print.

The printing is done with a linear photorecording set of electronically actuated dot elements 3, preferably an array of light emitting diodes (LED). These are small enough to locate within the very confined space limitations of compact cameras on either the outside of the film body or on the underside emulsion side 3. Preferably the light array is located in the camera back 4 for positioning in a pressure plate that rides on the film back to pass over the shown arc as the camera back is closed. The position along the edge is not critical except for being in a location that will permit scanning of the desired length of the photo frame being advanced in which the printed legend is to be added. Timing of the film from a resident photographing position 8 to reach the photo diode array and for linearly scanning the film and lighting the diodes with the proper intensity and timing to form dot matrix alphanumeric characters or other coded representations is electronically achieved from the synchronization signals derived from film movement detecting mechanism 2. The film (not shown) is rolled on respective rollers in the compartments 5 and 7 by the usual camera mechanisms, and wrench 6 can be used for manual or motorized rewind onto the roll in compartment 7. The camera contains the appropriate photographing shutters and lenses for operation in a conventional manner to take pictures.

The electronic circuitry, basically a data processing system, which could be a general purpose computer or the like having appropriate memory timing and data handling capability, is readily contained inside the back cover in this micro-chip age of the art. Thus the location 14 within the back portion of the camera as shown in FIG. 2 represents a data processing system. None of the equipment then needs to be located in the optical processing part of the camera where it could interfere or be difficult to locate. Electrical contact sets 9 and 10 are provided if there is need to have electrical contact between the main camera casing and the back, such as with LEDs located on the emulsion side of the film, or when the system is extracting data such as f stop, shutter speed, etc. information from the main body of the camera. A keyboard 11 for entry of variable information by the photographer is provided as well as a computer type digital line display 12 for monitoring the data to be entered by the keyboard.

FIG. 3 shows the keyboard keys in enlarged view, substantially in actual size. It can thus be seen that only seven keys are provided of large enough size to manipulate with fingers without interference, even though alphanumeric capabilities are provided. This keyboard system and its operation in a data processing system is described in detail in my co-pending application U.S. Ser. No. 844,875, filed Mar. 27, 1986, and the disclosure of that application is incorporated herein in its entirety by reference.

In the keyboard the seven keys are identified by the marginal legends 0, 1, 2, 3, 4, 5, and 6. The keys themselves carry identification of the entries possible from the seven keys, including the entire alphabet, decimal digits and control commands. In all forty-nine entries are available by means of an operating mode that requires two keystrokes per entry. The key legends identify both strokes necessary for an entry. For example, letter A is on key 1, which is the first of the two keys to be stroked for entering that letter. The second stroke, key 1, is identified by the subscript number alongside the letter A. Thus, for A, the entry strokes 1-1 are required. Similarly for the letter L the strokes 1-4 are required, etc. In this way all the desired information for alphanumeric entry is available from only seven keys as well as thirteen control commands and a dash (-).

Such control commands as space, back space, and clear are conventional typewriter type functions. Others may be explicitly used for the camera system of this invention such as print, f stop, shutter speed, date, time or other desired functions for aiding in the entry of data from a timer, register or sensor within the camera system to supplement the variable information to be entered by way of the keyboard, as will later become evident.

In FIG. 4 is depicted the nature of the entry of variable data 20 in a line on the edge of a photoprint 19 as achieved by this invention. The text is enlarged at 21 to show one manner in which it may be photoprinted by means of a set of five LEDs while the film is scanned. Thus the programming of the diodes need not be necessarily strictly in a dot matrix format, as indicated by the solid uppermost and lowermost lines in the decimal character 2. It is evident that the entire line could be filled with information if more is desirable, and that the information could be on the top of the print either alone or with the bottom legend. Thus, compared with prior art techniques the amount of data that can be photoprinted is substantially increased by the camera edge printing system of this invention.

Figure 5:
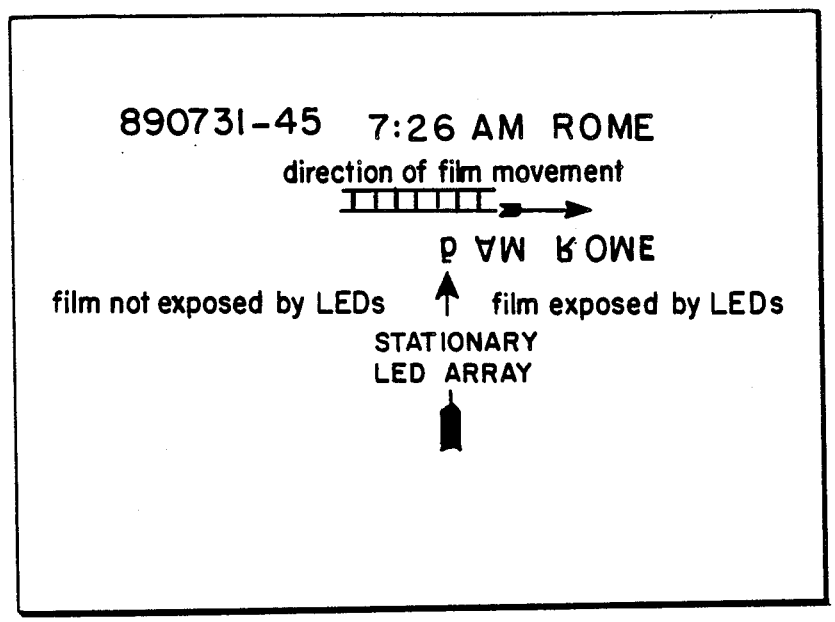
FIG. 5 is a layout sketch showing the relationship between the lettering and the film as recorded by this invention.

The relationships of the line of LEDs to the film edge in the recording step is diagrammatically set forth in FIG. 5. The direction of the film is shown by the smaller arrow. The top line is the desired printout legend for the film. To make this visible in that format, the characters are exposed upside down from right to left as indicated by the part of the film exposed by the LEDs. The data is accordingly arrayed for readout in that format and order from the line array of LEDs during the time that the film is being moved from frame to frame.

Figure 6:
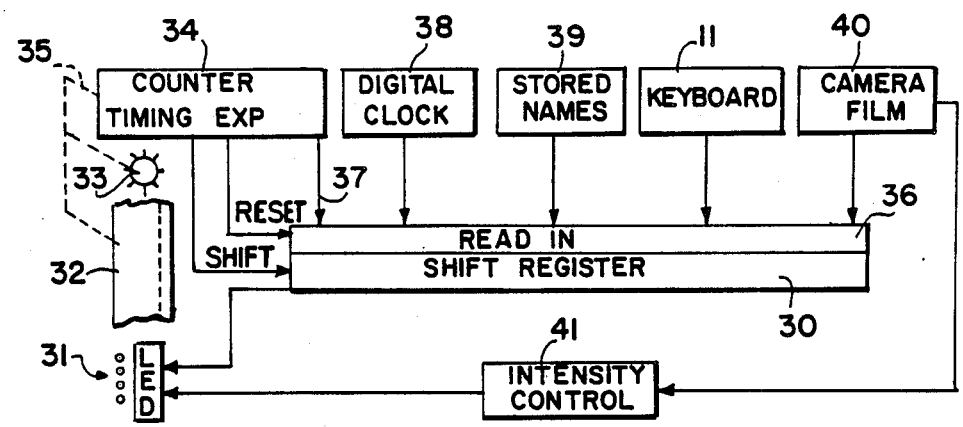
FIG. 6 is a block diagram of an electronic data processing system operable to produce the edge recorded messages.

The data processing system of FIG. 6 is a simplified and special purpose embodiment of means to organize, store and read out the data to be printed from a variety of sources including detectors and sensors in the camera mechanism. Alternately the same end result is attainable by a general purpose programmable computer configuration that has a random access memory and data organization and readout capabilities.

Thus, the shift register 30 stores the line of data to be printed on the photo frame by the LED array 31. The data is stored in the shift register in such format as to drive the LEDs for dot matrix type character formation. When the data is shifted out in sychronism with the timing of the movement of the film, the desired characters are formed in proper positioning on the line. Also the readout is begun at a time related to the presentation of the frame at the LED position by synchronously relating the movement of the film to the operation of the shift register.

For sychronization, the movement of the film 32 is sensed by a sprocket or roller wheel 33 or the like, to operate a counter-timer 34 as diagrammatically shown by dotted line 35. The counter-timer 34 then controls the shift pulses to time the positioning of each dot line produced with a corresponding movement of the film. This will effectively work whether the film is manually advanced at erratic speeds or is continuously advanced by a motor at a constant speed. Also the entire register is reset after every cycle to permit reading in of a new batch of variable data by means of the read in system 36 as provided by the various sources to identify the next picture to be taken.

Thus, data is read into the shift register in parallel from various memory banks and is read out in serial form line by line to the LED array 31. The counter 34 can supply the exposure number or serial number of a sequence of pictures as indicated at line 37. An internal digital clock can supply date and time as shown at 38. Stored names can be arranged such as in telephone number selection systems at 39 for selection and readout. This could include account numbers, client identification or other data. All or part of the information could be read in from the keyboard 11. Typically a title or the names of people could be entered to supplement internally derived data automatically presented. Camera data such as f stop, shutter speed and film characteristics may be sensed or provided by the keyboard as shown at 40. For example, the intensity or timing of the LEDs could be varied for different films, or for different scanning speeds by deriving information from the synchronizing means 35 by means of intensity control device 41.

Reference is now made to the keyboard of FIG. 3 and to the keyboard control system to which it relates. There is provision for a number of control signals thereon. For example the key sequence 6-6 indicates "print", which would call for the loading up of the memory such as the shift register with the information to print on the film as the system is further triggered by the advance of the film to the next frame. Key sequence 1-0 would call for the entry of an f stop setting into the data bank if this information is to be included in the other formatted data to be displayed in the window or photoprinted on the film. Similarly 2-0 would include the shutter speed as a display or printout item. The automatic recording of such data will permit the photographer to better analyze the picture taking technique.

The "0" key, except for entry of the decimal digit "0" by the 0-0 key sequence, may be used for control purposes. Strokes 0-1 thus could signify the inclusion of the date in the format of the data to be printed, and similarly 0-5 the time. These would be available from a calendar/clock built into the system. In any event it is seen that several control signals can be allocated to desired functions desired for the printing of the available information on the picture. Such entries could include "auto" for selecting an automatic dumping of the data in the memories for the next cycle as the operation mode. Similarly, "Man" could indicate a manual entry mode, etc. For programmable computers subroutines may be recalled by the available control slots for those control functions desirable in any particular camera system. Any of the desired programming techniques available in data processing equipment whether it be a general purpose of a special purpose system thus can be employed by this simple keyboard in display systems such as this camera printing system.

The keyboard is used for two purposes, namely: (1) to format data which the camera already "knows", and (2) to input data for formatting which the camera cannot know. For instance from detectors within the camera, the system already knows f stop, shutter speed, film characteristics, frame number, date, time, etc. What it does not know is the subject's name, the place where the photograph is being taken, the customer's name or account number, etc.

Some photographers may choose to format the data with the year first, day second and year third; some may wish to include f stop, with or without shutter speed and/or film type, etc. The keyboard herein is used therefore as a formatting tool, and also for entering the "unknown" information to be printed.

The print function 6-6 is essentially a toggle switch which establishes the print mode and exits therefrom either automatically upon printout or by manual choice. The formatted data may be printed at the will of the photographer, and may be monitored on the LCD display window until cleared (3-0). The LCD window also will note with legends that will not be printed, that the printer is in the print mode, and any other desired data such as the f stop reading, etc.

I claim:

1. A compact camera for processing rolls of photographic film, comprising in combination, a light tight film processing compartment with an openable access cover for changing film rolls, a film viewing plane inside the camera defining a film frame to receive an exposure from a camera shutter mechanism and optic system when the cover is closed, means for moving the film on the rolls to present a series of film frames at said viewing plane, electronically programmable light emitting means mounted for exposing a predetermined linear portion of the film plane to photographically record thereon a plurality of data bits in response to electronic programming of the light emitting means, and electronic means for programming the data bits to record a line of coded data along the film frame in synchronism with movement of said film by said moving means to present the sequence of film frames at the viewing plane.

2. The camera defined in claim 1, wherein the electronic means includes a manual entry keyboard system for entering alphanumeric data.

3. The camera defined in claim 2, wherein the keyboard system has a keyboard with only seven keys.

4. The camera defined in claim 2 wherein the electronic means comprises a set of at least five elements for forming dot matrix type characters arranged for abutting the film along a line substantially perpendicular to the film movement, and programming means for organizing a line of coded data into a series of dot groups timed for causing the elements to photographically record a line of information along the film.

5. The camera defined in claim 2 including a roller mechanism placed in the cover for movement in synchronism with the film coupled with synchronizing means to program the data bits for proper location on the film as it is being moved.

6. A camera as defined in claim 1 wherein all the apparatus for recording the line of coded data along the film frame is positioned in the cover.

7. A camera as defined in claim 6 wherein the apparatus comprises an electronic computer with a keyboard and an electronic display for indicating a line of text entered manually by the keyboard for recording on the film.

8. A camera as defined in claim 1 having a keyboard for manual entry of data to be recorded with seven keys and operable to enter data in response to two successive keystrokes, thereby providing a selection of forty-nine entries including a full set of alphabetic characters and decimal digits.

9. A compact roll film camera system for recording a variable printed legend upon photographed film portions in response to a keyboard located upon a camera housing, comprising in combination, a set of seven keys in said keyboard programmed to enter a set of forty-nine entries in response to combinations of two sequential strokes of selected ones of the seven keys, and means to present from said entries a set of alphanumeric characters for recording messages presented from the keyboard upon the photographed film portions in a predetermined location.

10. A camera system as defined in claim 9 further comprising, means within the camera housing for moving film from frame to frame, means responsive to movement of the film to generate timing signals, and means responsive to the timing signals to serially locate upon the film as it is being moved a sequence of characters including characters selected by said keyboard.

11. A camera system as defined in claim 10 further comprising, recording means for photographically printing on the film within the camera constituting a line of light emitting elements forming a plurality of bits from which characters may be formed by selective actuation thereof, character storage means for retaining characters selected from the keyboard, and means actuating the light emitting elements in a sequence of selections to produce on the film a photograph image of alphanumeric information extending along a line disposed in the direction of movement of the film.

12. The method of photographically recording a line of variable coded information on photographic frames from apparatus contained within a compact roll film camera system comprising the steps of:
sensing the movement of film within the camera as it is moved from frame to frame,
disposing in a line a plurality of electronically controllable elements for recording photographically in separate bit positions along the line with the line disposed to record along a linear portion of the film as it is being moved from frame to frame,
storing data relating to a picture that has been taken including variable data manually entered, and
programming the elements with electronic processing equipment to record along the linear portion of the film in sychronism with the movement of the film a sequence of discrete combinations of the bit positions for forming visibly readable coded information from the stored data.

* * * * *

UNITED STATES PATENT AND TRADEMARK OFFICE
CERTIFICATE OF CORRECTION

PATENT NO. : 4,705,372
DATED : November 10, 1987
INVENTOR(S) : James M. Lapeyre

It is certified that error appears in the above-identified patent and that said Letters Patent are hereby corrected as shown below:

The abbreviation "LED" in Figure 2 should read "LCD".

Signed and Sealed this

Twelfth Day of July, 1988

Attest:

DONALD J. QUIGG

Attesting Officer      Commissioner of Patents and Trademarks